United States Patent
Bayat et al.

(10) Patent No.: US 9,713,217 B2
(45) Date of Patent: Jul. 18, 2017

(54) DUTY CYCLE BRIGHTNESS CONTROL FOR LIGHTING DEVICE

(71) Applicant: Bayco Products, Inc., Wylie, TX (US)

(72) Inventors: Bijan Bayat, Plano, TX (US); James Conner, Rockwall, TX (US)

(73) Assignee: Bayco Products, Inc., Wylie, TX (US)

( * ) Notice: Subject to any disclaimer, the term of this patent is extended or adjusted under 35 U.S.C. 154(b) by 0 days.

(21) Appl. No.: 15/080,168

(22) Filed: Mar. 24, 2016

(65) Prior Publication Data

US 2016/0286613 A1    Sep. 29, 2016

Related U.S. Application Data

(60) Provisional application No. 62/138,123, filed on Mar. 25, 2015.

(51) Int. Cl.
*H05B 33/08* (2006.01)
*F21V 25/12* (2006.01)
*F21V 5/04* (2006.01)

(52) U.S. Cl.
CPC ..... *H05B 33/0845* (2013.01); *H05B 33/0818* (2013.01); *Y02B 20/346* (2013.01)

(58) Field of Classification Search
CPC H05B 33/08; H05B 33/0803; H05B 33/0818; H05B 33/0845; H05B 41/16; H05B 41/36; H05B 37/02; F21V 25/12; F21V 5/04; F21Y 2101/02; F21Y 2103/003
See application file for complete search history.

(56) References Cited

U.S. PATENT DOCUMENTS

| | | | |
|---|---|---|---|
| 4,646,219 A | 2/1987 | Rohl | |
| 4,866,345 A * | 9/1989 | Kataoka | B60Q 9/00 307/10.8 |
| 6,046,572 A | 4/2000 | Matthews et al. | |
| 7,218,086 B1 | 5/2007 | Ritter et al. | |
| 7,321,203 B2 | 1/2008 | Marosek | |
| 7,492,108 B2 | 2/2009 | Garcia et al. | |
| 7,550,934 B1 | 6/2009 | Deng et al. | |
| 7,649,326 B2 | 1/2010 | Johnson et al. | |
| 7,651,239 B2 | 1/2010 | Spartano et al. | |
| 7,746,300 B2 | 6/2010 | Zhang et al. | |
| 7,755,303 B2 | 7/2010 | Johnson et al. | |
| 8,035,312 B2 | 10/2011 | Bodano | |

(Continued)

OTHER PUBLICATIONS

Energizer® with Light Fusion Technology 3-in-1 LED Flashlight, product website, 3 pages, © 2000-2016 www.energizer.com/flashlights-lighting.

(Continued)

*Primary Examiner* — Thai Pham
(74) *Attorney, Agent, or Firm* — Whitaker Chalk Swindle & Schwartz PLLC; Stephen S. Mosher (57) ABSTRACT

A brightness control circuit for a DC-powered LED light uses a PWM generator. The LED brightness is a function of the duty cycle of a drive signal to a transistor connected in series with the LED. In several embodiments the duty cycle signal generated by the PWM is controlled by at least one momentary SPST switch, or, in one alternative, by first and second SPST switches operable in a make-before-break sequence in a voltage divider circuit.

25 Claims, 4 Drawing Sheets

(56) References Cited

U.S. PATENT DOCUMENTS

| | | |
|---|---|---|
| 8,059,432 B2 | 11/2011 | Kraft |
| 8,120,402 B2 | 2/2012 | Zhang et al. |
| 8,390,262 B2 | 3/2013 | Chang et al. |
| 8,395,329 B2 | 3/2013 | Jutras et al. |
| 8,405,319 B2 | 3/2013 | Sadwick et al. |
| 8,476,836 B2 | 7/2013 | van de Ven et al. |
| 8,659,237 B2 | 2/2014 | Archenhold |
| 8,686,654 B2 | 4/2014 | Hawley |
| 8,723,444 B2 | 5/2014 | Pansier |
| 8,754,585 B1 * | 6/2014 | Bahrehmand ...... H05B 33/0818 315/287 |
| 2006/0187236 A1 * | 8/2006 | Runnels ............ H05B 33/0863 345/593 |
| 2009/0189548 A1 * | 7/2009 | Hoffman ............... H01M 10/44 315/307 |
| 2010/0090612 A1 * | 4/2010 | Spartano ................ F21L 4/027 315/287 |
| 2011/0248640 A1 | 10/2011 | Welten |
| 2012/0062133 A1 * | 3/2012 | Cubias ............... H05B 33/0809 315/201 |
| 2014/0049177 A1 * | 2/2014 | Kulczycki .......... H05B 33/0854 315/209 R |
| 2014/0265929 A1 | 9/2014 | Gossehelweg et al. |

OTHER PUBLICATIONS

Texas Instruments, General Purpose LED Lighting PWM Controller, journal, 20 pages, © 2010, Texas Instruments Incorporated www.ti.com.

* cited by examiner

DUTY CYCLE BRIGHTNESS CONTROL FOR LIGHTING DEVICE

CROSS REFERENCE TO RELATED APPLICATIONS

The present application claims priority to U.S. Provisional Patent Application Ser. No. 62/138,123 filed Mar. 25, 2015 by the same inventors and entitled DUTY CYCLE CONTROL FOR LIGHTING DEVICE.

BACKGROUND OF THE INVENTION

1. Field of the Invention

The present invention generally relates to illumination using light emitting diodes (LEDs) and more particularly to brightness control circuitry for LED lighting apparatus.

2. Background of the Invention and Description of the Prior Art

There are a great many applications for light emitting diodes in apparatus intended for both signaling and illumination functions. Displays, lighting fixtures, signal lighting for vehicles and roadways, worklights for reading or performing close operations needing an intense, focused light source, portable lighting devices such as emergency lamps or flashlights, safety signaling products, are just a few such applications. Many of these application require the ability to control the beam geometry; other applications seek to control the brightness or illumination (light output in lumens) to provide the performance and variability required in given applications.

However, conventional circuits devised for controlling the light output from LED devices are too often complex, inefficient, expensive, insufficiently rugged, etc. for use in hand-held lighting devices such as flashlights used by public safety units—police, fire, the National Guard, etc.—where ruggedness, reliability, and uncomplicated control features are required. Complex circuits tend to be less reliable and more difficult to design to meet intrinsically safe standards. Some circuits employing switching regulators, which while efficient, may be susceptible to strong electromagnetic fields that may cause electromagnetic interference (EMI) when public safety personnel (police, fire, etc.) key their radio equipment while using their hand-held lighting devices. This situation, which may render hand-held lighting devices unsuitable because an expected mode of operation was impaired or even inoperative, is a completely inappropriate and potentially dangerous circumstance in a dark space that may place police or fire personnel at risk. What is needed is a circuit or apparatus for controlling LED lighting devices that are not susceptible to such problems.

SUMMARY OF THE INVENTION

Accordingly, the present invention provides, in a first embodiment a brightness control circuit for an LED emitter, comprising an LED and a transistor connected in series across a DC voltage source having a source terminal and a return terminal; a microprocessor having a non-volatile memory, the microprocessor connected across the DC voltage source, and an output of the microprocessor connected to an input of the transistor; a switch actuator circuit coupled between at least one input of the microprocessor and the return terminal for entering user commands to select discrete brightness levels of the LED emitter; and a program stored in the non-volatile memory containing control instructions defining a sequence of pulse width modulated signals responsive to the operating state of the switch actuator circuit for controlling the brightness levels of the LED emitter.

In one aspect of the first embodiment the program comprises a defined sequence of operations providing discrete brightness levels, including a first level providing a high brightness corresponding to a first defined interval; a second level providing a medium brightness corresponding to a repeat of the first defined interval; and a third level providing a low brightness corresponding to a second repeat of the first defined interval; wherein the program cycles through each brightness level in a predetermined sequence if a first set of switch contacts are held closed; or the program stops within a brightness level in the sequence if the switch contacts of the at least one single pole switch are released to select that brightness level.

In another aspect of the first embodiment, the high, medium, and low brightness levels of the LED correspond to duty cycle ON times of approximately 80%, 50%, and 20% respectively.

In a second embodiment, the present invention provides a brightness control circuit for an LED device, comprising an LED and a transistor connected in series across a DC voltage source having a source terminal and a return terminal; a PWM generator connected across the DC voltage source, and an output of the PWM generator connected to an input of the transistor; an input of the PWM generator connected to the DC voltage source through a first resistor and the input of the PWM generator connected to the return terminal of the DC voltage source through a parallel combination of a second resistor in series with a first SPST switch and a second SPST switch; wherein the first and second SPST switches are operable in a make-before-break sequence.

In one aspect of the second embodiment, the PWM generator is a microcontroller programmed to provide a sequence of duty cycle signals responsive to the operating states of the first and second SPST switches such that each duty cycle signal controls a defined brightness level of the LED device; wherein the sequence of states of the first and second switches are associated respectively with duty cycles defined as discrete high, medium, and low brightness levels of the LED.

In another aspect of the second embodiment, the high, medium, and low brightness levels of the LED correspond to duty cycle ON times of approximately 80%, 50%, and 20% respectively.

In a third embodiment, the present invention provides a brightness control circuit for an LED emitter, comprising an LED and a transistor connected in series across a DC voltage source having a source terminal and a return terminal; a microprocessor having a non-volatile memory, the microprocessor connected across the DC voltage source, and an output of the microprocessor connected to an input of the transistor; a switch actuator circuit coupled between the source and return terminals and having an output coupled to an input of the microprocessor for entering user commands to select discrete brightness modes of operation of the LED emitter; and a program stored in the non-volatile memory containing control instructions defining a sequence of pulse width modulated signals responsive to the operating state of the switch actuator circuit for controlling the brightness modes of operation of the LED emitter.

In one aspect of the third embodiment, the present invention the switch actuator circuit comprises a first resistor connecting the input of the microprocessor to the source terminal; a second resistor and a first set of SPST switch contacts connected in series between the input of the microprocessor and the return terminal; and a second set of SPST switch contacts connected between the input of the microprocessor and the return terminal; wherein the first and second sets of SPST switch contacts are coupled together such that after the first set of SPST switch contacts are closed in a first step, executing a second step closes the second set of contacts before opening the first set of contacts in a make-before-break sequence.

In other embodiments, the invention may include a fuse and/or resistor combination for use in products that comply with the standards for intrinsically safe operation such as in explosive environments.

DETAILED DESCRIPTION OF THE INVENTION

In an advance in the state of the art, the present invention combines the simplicity of a battery-operated pulse width modulation (PWM) circuit to provide a brightness control circuit for a DC-powered LED lighting device. Brightness control circuits that vary the DC current supplied to the LED device(s) using switching regulators tend to be susceptible to external EMI fields. Analog circuits are effective but are not very efficient, and therefore have a reduced battery life. Both of these deficiencies are crucial to the use of LED flash lights by public safety personnel where immunity to external EMI fields and long battery life are important attributes sought by users of such devices. The use of a PWM generator enables the use of discrete duty cycle values to define a set of predetermined brightness levels deemed most useful to the user. Moreover, if the repetition rate of the PWM drive signal is greater than approximately 100 Hz, the pulsed drive appears continuous to the human eye.

In one embodiment of the present invention, the brightness level of the LED may be controlled by a single normally open, SPST (single pole, signal throw) momentary switch for inputting contact closures, momentary or timed, for signaling mode or level selection choices to a programmed microprocessor configured as a PWM generator. The microprocessor generates variable duty PWM drive signals that are fed to an LED device driver transistor. The circuit is ideally suited for hand-held lighting devices because it offers a compact, reliable, simple to use, and low cost implementation. In the following detailed description, reference numbers appearing in more than one drawing refer to the same structural element. A microprocessor may also be called a microcontroller.

Figure 1:
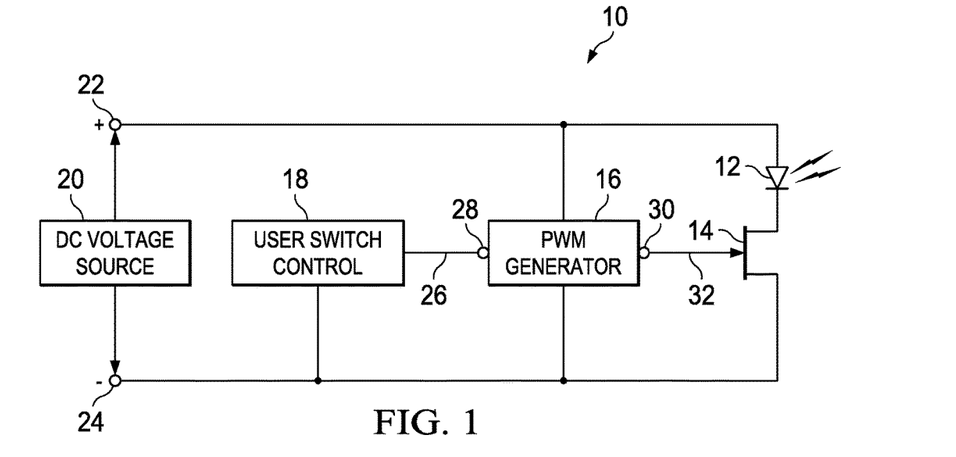
FIG. 1 illustrates a generalized circuit diagram of one embodiment of the present invention.

FIG. 1 illustrates a generalized circuit diagram of one embodiment of the present invention. The brightness control circuit 10 includes several circuit branches all connected to a DC voltage source 20 via source 22 and return 24 terminals. A light emitting diode (LED) 12 is connected in series with a transistor 14 to the terminals 22, 24. A PWM generator 16 is connected to the DC voltage source 22 and return 24 terminals. The PWM generator 16 receives an input signal 26 from a user switch control 18 as shown. In one embodiment depicted in FIG. 2B the PWM generator may be configured by a microprocessor 50 having a program 54 stored in a non-volatile memory 52 of the microprocessor 50 may be connected to terminals 22, 24. The microprocessor 50 in the illustrated embodiment may be used primarily for generating pulse-width-modulated (PWM) signal for controlling the brightness of the LED 12.

LED 12 may be a module containing one or more LED elements. LED 12 may alternatively represent more than one light emitter, perhaps of different beam types—e.g., flash or flood beams, wherein each beam may be separately controlled by its own driver circuit or its own control switch, etc. Further, a single PWM generator 16 may have individual outputs responsive to particular switch contact operations to control the intended light beam. Thus, the circuits illustrated in FIGS. 1, 2A, and 2B are representative.

Figure 2A:
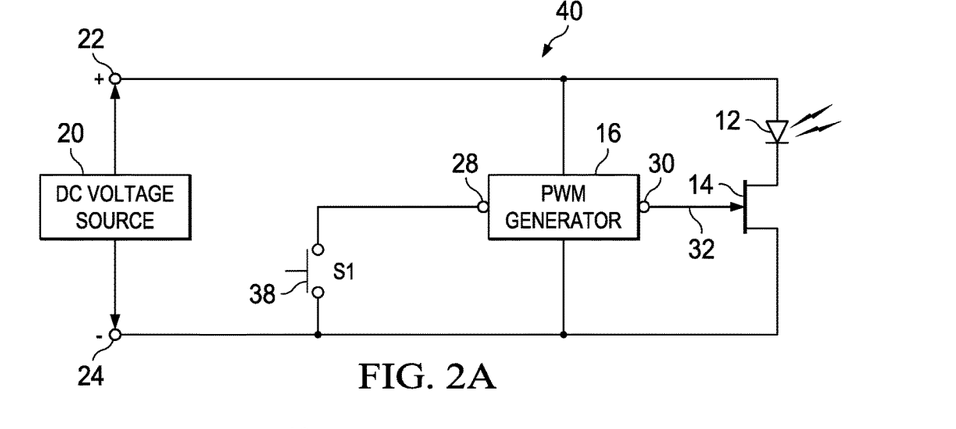
FIG. 2A illustrates a first alternative of the embodiment of FIG. 1.
Figure 2B:
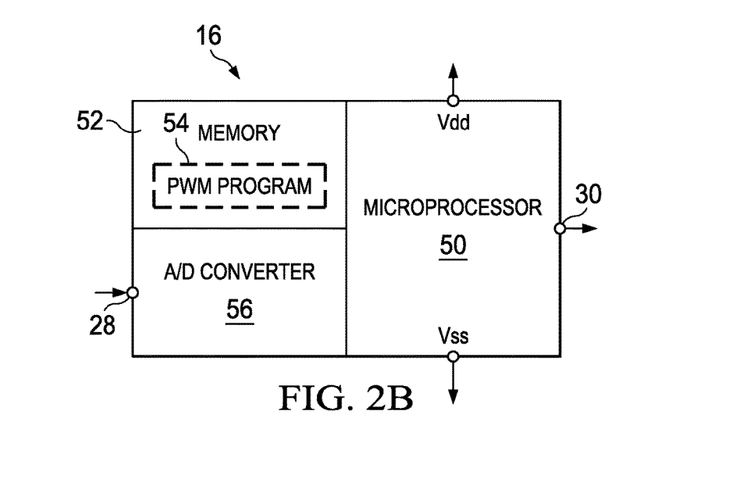
FIG. 2B illustrates one embodiment of a PWM generator as used in the embodiment of FIG. 2A.
Figure 6:
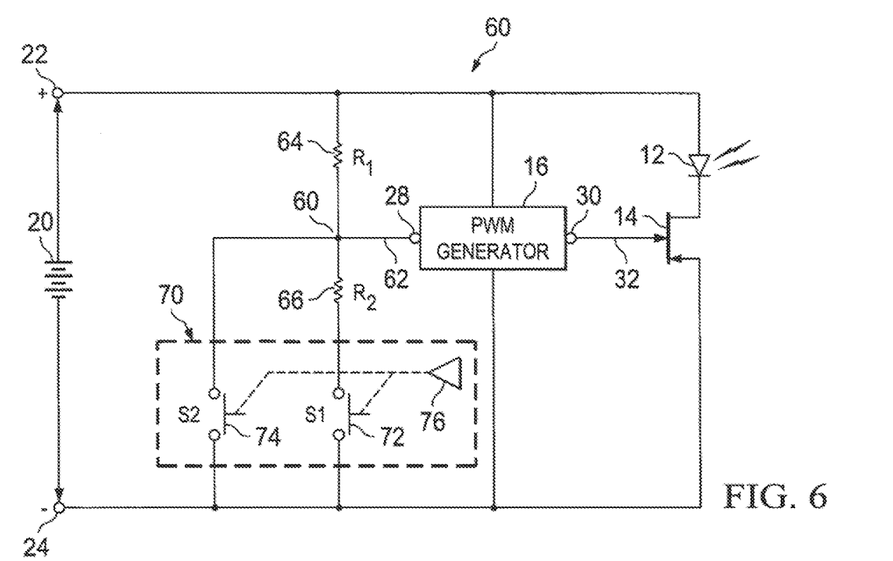
FIG. 6 illustrates a circuit diagram of a second alternative of the embodiment FIG. 1.

In the microprocessor embodiment of FIG. 2B, the program 54 may contain instructions for generating the PWM signal output 32 from the microprocessor 50 for controlling the brightness of the LED 12. Thus, an output signal 32 of the microprocessor 50, provided at the output terminal 30, may be connected to the input of the driver transistor 14. A user switch control 18 (or, the switch 38 shown in FIG. 2A) may be connected between an input 28 of the PWM generator 16 of FIG. 1 or of the microprocessor 50 of FIGS. 2A and 2B. The switch control 18 may simply include a single SPST switch as shown in FIG. 2A or may include any of a variety of switch circuits, one of which is depicted in FIG. 6 to be described.

In the illustrated embodiment the switch 38 may be a normally open SPST switch having a momentary action; that is, the switch does not latch when its contacts are closed (i.e., made). Releasing the button for the switch 38 thus opens the contacts, that is, it "breaks" the connection. This type of switch facilitates the operation of the PWM generator 16 by sending momentary LO signals to an input of the microprocessor 50, subsequently to be processed by the operating program 54 in the memory 52 of the microprocessor configured as a PWM generator 16. These momentary contact closures connect the input 28 of the microprocessor 50 to the common return terminal 24 to signal the microprocessor to advance to the next step. In other embodiments that configure the user switch control 18 to use DC voltages to supply mode selection inputs, the signals may be processed by an analog-to-digital (A/D) converter within the microprocessor, as in the example described in FIG. 6.

Figure 3:
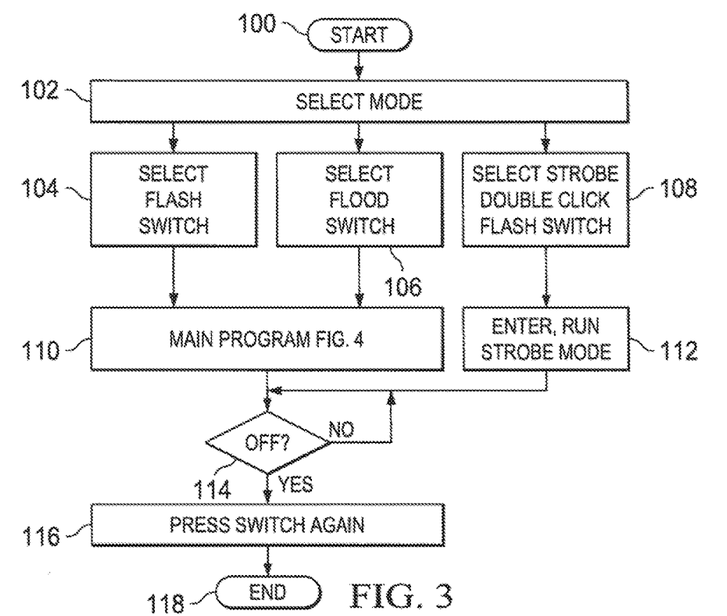
FIG. 3 illustrates a flow chart for the embodiment of FIG. 2.
Figure 4:
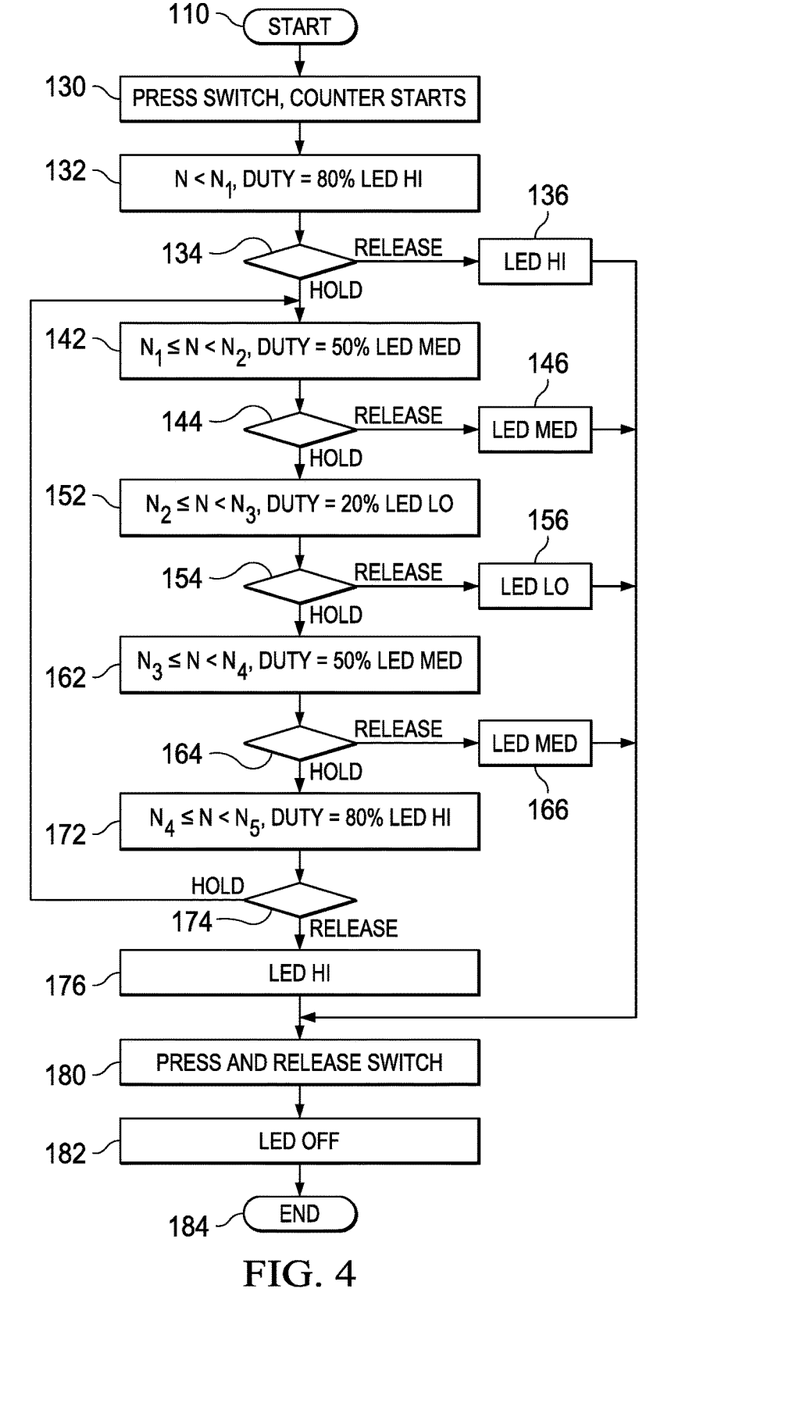
FIG. 4 illustrates a flow chart depicting a program sequence for use in the flow chart of FIG. 2.

FIG. 3 illustrates a flow chart for the embodiment of FIG. 2A that employs a microprocessor for the PWM generator as shown in FIG. 2B. The flow chart of FIG. 3 is a general sequence of operations for the various operating modes of a product such as a flash light that provides flash light (or spotlight) beam or a flood light beam, for example. FIG. 4 provides further detail regarding the control of the brightness levels for an LED light emitter. In FIG. 3, the flow begins at step 100, proceeding to a Select Mode step 102 during which the user may make one of three selections: Select Flash Switch 104 to turn ON the flash light beam, Select Flood Switch 106 to turn ON the flood light beam, or press the Flash Switch twice (i.e., double click) at step 108 to activate the Strobe mode of the flash light beam. Selection of Flash or Flood mode advances the routine to step 110 to enter the main program depicted in FIG. 4 to be described. Selection of the Strobe mode advances to step 112, where the flash light emitter is caused to flash at a predetermined rate until the switch S1 (switch 38 in FIG. 2A) is pressed again.

Continuing with FIG. 3, after the main program (to be described) is completed, the flow proceeds from step 110 to step 114 to a query: turn OFF the activated mode? If YES, the flow advances to step 116. If NO, the flow advances to the input of step 114. This cycling action will continue until the user desires to turn OFF the current operating mode by pressing the switch again at step 116 and the main program ends at step 118.

FIG. 4 illustrates the main program flow chart depicting one example of a program sequence for use in step 110 of the flow chart of FIG. 3. The sequence begins at step 110 (from FIG. 3) whereupon the process starts when the user presses the switch at step 130 to start a counter in the microprocessor 50. As will become apparent in this example, the selected brightness levels are related to the number of counts relative to a datum, in this case the datum may be defined as N=0. The counter runs through a series of thresholds, whereby each threshold defines one of several discrete brightness levels. Each threshold may be designated by an N number such as N1, N2, . . . N5. N1 corresponds to a HIGH brightness level (abbreviated "HI"); N2 corresponds to a MEDIUM ("MED") brightness level; N3 to LOW ("LO"); N4 to MED; and N5 to HI. This sequence repeats until the switch is released to stop the counter at a selected brightness. If the switch is pressed again, the process aborts and the light emitter (LED 12) turns OFF.

In the illustrated embodiment, the HI brightness results when the PWM duty cycle is set to, e.g., 80%, as will be described further in FIG. 5, which depicts the PWM timing waveforms. Similarly, a MED brightness is provided when the duty cycle is 50%, and a LO brightness is defined when the duty cycle is 20%. These assignments of the values of N, the corresponding brightness, and the percentage (%) duty cycles are arbitrary and are presented here to illustrate the concept and the method. Persons skilled in the art will recognize that various assignments of values and combinations thereof may be made to suit a particular application. In this illustrated example, the duration of the time a brightness level remains illuminated while the switch is held pressed may be one second, with the counter values and thresholds adjusted accordingly.

In the illustrated embodiment of the process, the counter value N1 defines a threshold for jumping from an 80% duty cycle to a 50% duty cycle, and N2 defines a threshold for jumping from the 50% duty cycle to a 20% duty cycle. Further, N3 defines a threshold for jumping from 20% duty cycle to a 50% duty cycle, N4 defines the threshold for jumping from the 50% duty cycle to the 80% duty cycle, and N5 defines the end point of the process, where the counter resets to N=0 and the process repeats unless one of the aforementioned actions occurs.

Continuing with FIG. 4, when the user pressed and holds pressed the switch in step 130, in step 132 the counter begins counting from N=0 toward the first threshold N1. The microprocessor outputs an 80% duty PWM signal at terminal 30 to drive the LED to the HI brightness level. If the switch S1 is released the LED brightness remains HI until the switch S1 is pressed and released again in step 180 to turn the LED OFF in step 182 and the process ends at step 184. If the switch is still held pressed when N=N1, the process changes the duty cycle to 50% in step 142, the microprocessor outputs the 50% duty PWM signal at terminal 30 to drive the LED to the MED brightness level, and the counter continues to run. If the switch S1 is released in step 144 before N reaches N2, the LED remains at MED brightness in step 146. If the switch is held pressed until the counter reaches N=N2 in step 152, the duty cycle changes to 20%, which drives the LED 12 at a LO level until the switch S1 is pressed and released again as in steps 156, 180, and 182 to turn the LED OFF.

If the switch S1 remains held at step 154, when N=N3 the process advances to step 162 and the duty cycle increases to 50% to drive the LED to the MED brightness level. As before, if the switch S1 is released during step 164 while the counter is counting toward the next threshold, here N4, the process advances to step 166 to hold the LED at the MED brightness level until the switch is pressed and released again in steps 180 and 182 to turn OFF the LED. However, when N reaches N=N4 in step 172 the duty cycle increases again to 80% to drive the LED to the HI brightness level. If the switch S1 is released in step 174, the LED remains in a HI state until the switch S1 is pressed and released again in steps 176, 180, and 182 to turn OFF the LED. However, if the switch S1 is held pressed until N=N5, the flow of the process advances to step 142 via step 178 to reset the counter to N=0, and the process continues to run until a release of the switch. Depending on what point in the process of FIGS. 3 and 4 the switch is pressed and released. The LED illumination will correspond to the user's wishes.

Figure 5:
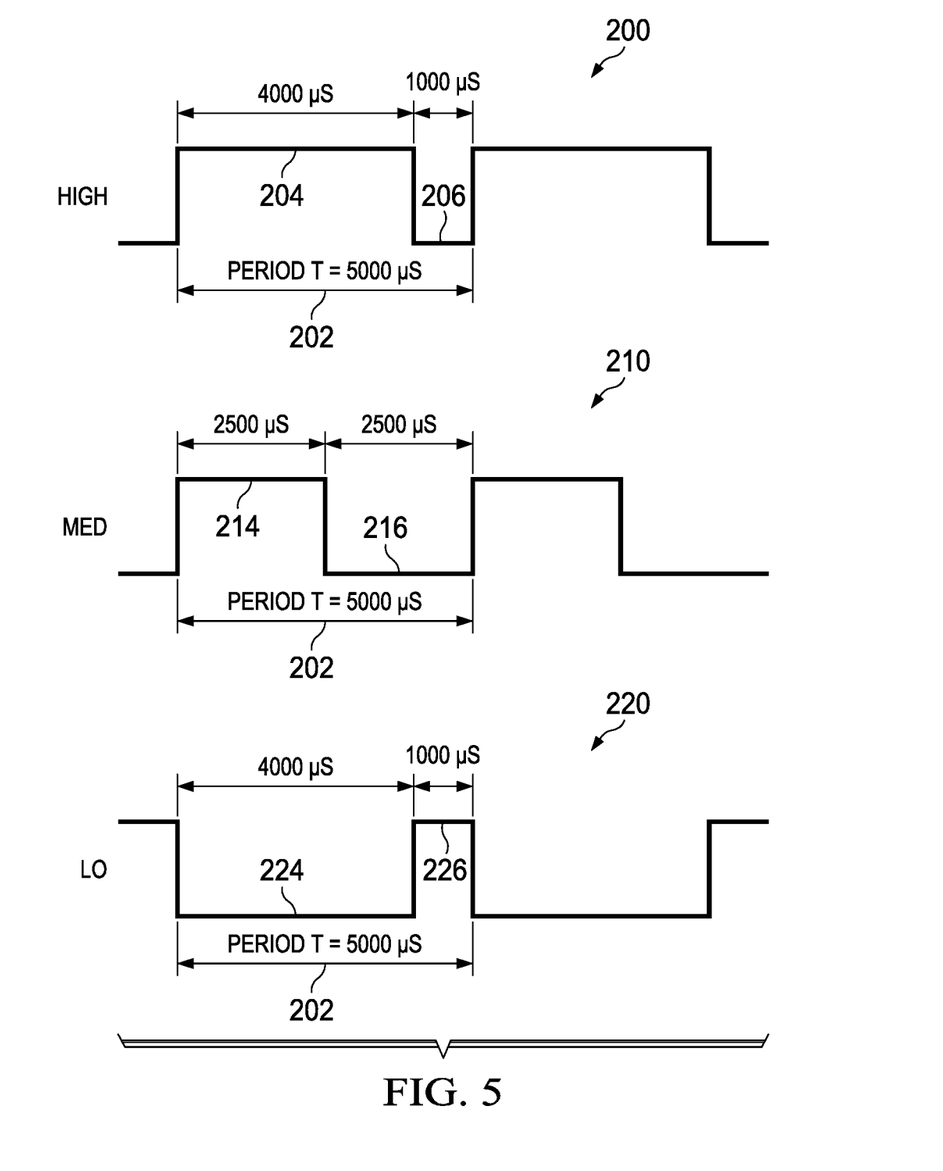
FIG. 5 illustrates a set of timing diagrams corresponding to high, medium, and low brightness levels of the embodiments of FIG. 1.

FIG. 5 illustrates a set of timing diagrams corresponding to the HI, MED, and LO brightness levels of the embodiments as described above. The example is given using arbitrary values to illustrate the concept. Persons skilled in the art will recognize, however, that timing frequencies, counter intervals, and time values may all depend on the operating clock frequency chosen for the microprocessor. Timing frequencies are typically derived from the clock frequency employed in the circuit. Counter intervals may be defined by a range of count values that may be related to time values. As in the example described above for FIGS. 3 and 4, a duty cycle signal as illustrated in FIG. 5 may represent a particular frequency that has a period of 5000 microseconds, which would be 200 Hz. A counter may be configured to increment one count every 2.5 milliseconds, so that the time value of N (the number of counts)=400 corresponds to a one second time interval. Thus a brightness level may be defined by a count value that corresponds to a time interval of one second. Further, several brightness levels can be defined by successive time intervals within a complete count sequence that are determined by count values. Thus a first interval might be defined by 0<N<N1, N1</=N<N2, etc. where N1 specifies a threshold for changing a duty cycle from 80% to 50%, N2 specifies a threshold for changing a duty cycle from 50% to 20%, and so on. Continuing, N3 may specify a threshold for changing a duty cycle from 20% to 50%, and N4 may specify a threshold for changing a duty cycle from 50% to 80%, and N5 may define an end point of the fifth duty cycle interval, at which time the sequence may end or repeat itself.

In the example above, the LED is illuminated by drive signals having respectively, 80% 50%, and 20% duty cycles, which correspond directly with the driving levels assigned to the LED. Accordingly, a timing diagram for a suitable signal appears in FIG. 5 that depicts time intervals for a 200 Hz square wave timing signal having a period T (202) of 5000 micro-seconds (uSec). The three duty cycle periods are illustrated and labeled as (a) waveform 200; (b) waveform 210, and (c) waveform 220. For the 80% duty cycle, the waveform 200 is HI at 204 for 4000 uSec, and LO at 204 for 1000 uSec. For the 50% duty cycle, the waveform 210 is HI at 214 for 2,500 uSec, and LO at 216 for 2,500 uSec. For the 20 duty cycle, the waveform 220 is LO at 224 for 4000 uSec, and HI at 226 for 1000 uSec.

FIG. 6 illustrates a circuit diagram of another embodiment of the present invention. The brightness control circuit 60 includes an LED 12 connected in series with a transistor 14 across a DC voltage source 20 (shown as a battery 20) having a source terminal 22 and a return terminal 24. A PWM generator 16 having an output terminal 30 and an input terminal 28 is connected between the DC source and return terminals 22, 24 and provides a duty cycle output signal 32 to an input of the transistor 14. A first resistor R1 (64) is connected between the DC source terminal 22 and the input 28 to the PWM generator 16. A second resistor R2 (66) and a first SPST switch S1(72) in series are connected between the input 28 and the DC return terminal 20. A second SPST switch 74 is also connected between the input 28 and the DC return terminal 24.

The first and second SPST switches S1, S2 (72, 74) are preferably normally open momentary switches packaged in a single unit 70 operable by a tactile "snap dome" actuator 76. When pressed, the thin, convex actuator 76 first closes the S1 contacts printed on a substrate, then, as the actuator 76 is pressed further, it opens the S1 contacts and closes the S2 contacts in a make-before-break sequence. This is one example of a dual action switch that employs a thin, dome-shaped actuator 76 that provides a tactile feel when the second set of SPST contacts make, before the first set of SPST contacts break. The tactile feel is provided through the "oil can" or "snap" operation of the actuator 76. Thus, in the circuit of FIG. 6, S1 contacts close, S2 contacts close and S1 contacts open, to select the DC voltage from the voltage divider formed by the resistors R1 (64) and R2 (66) connected in series between the DC source 22 and return 24 terminals. As will be described, these DC voltages may be converted to a digital number in an analog-to-digital (A/D) convertor 56 within the microprocessor configured as the PWM generator 16, for example as described in FIG. 2B. The digital number then specifies a selected parameter of a corresponding duty cycle signal to be provided by the PWM generator 22.

As described herein above, the brightness control circuits 10, 40, and 60 the PWM generator may preferably be a microprocessor, such as a type PIC 12F683 micro controller, that is programmed to generate the duty cycle signal in response to the DC voltage level present at the Vin input 28 that is set by the condition of the switch contacts S1 (72) and S2 (74). The switches S1, S2 (72, 74) shown in this example as a switch assembly 70 may preferably be a type PTS125 tactile switch from C&K components, Inc., Newton, Mass. The actuator is operated by pressing it like a switch button. The transistor Q1 (14) may be a NMOS FET #S12302, although persons skilled in the art will recognize the other transistor types, including bipolar transistor may be used as well. The DC voltage source 20 may be a battery as shown in FIG. 6 that is sized for the particular application.

In another embodiment, the microprocessor 50 used as the PWM generator 16 may interpret the state of the switch contacts S1 and S2 by counting through a sequence of 1-1000 counts that begin when S2 is closed (switch button pressed and held). Thus the brightness levels correspond to the count values such that when 0<N<400, the LED 12 is HI; when 400<N<700, the LED 12 is MED; and when 700<N<1000, the LED 12 is LO. As long as the switch button is held pressed, this sequence repeats in similar fashion to the process depicted in FIG. 4 until the button is released and the LED brightness corresponds to the value of N, where N=number of counts. The respective ranges of the count (N) values may also be correlated with the DC voltage value applied to the Vin input 28 of the microprocessor 50.

The foregoing examples are illustrative of possible embodiments. Persons skilled in the art will appreciate that other sequences for the cycling and selection of the LED brightness levels are possible, and may readily be adapted to suit particular applications with the circuit embodiments illustrated in FIGS. 1, 2A, 2B, and 6.

While the invention has been shown in only a few of its forms, it is not thus limited but is susceptible to various changes and modifications without departing from the spirit thereof. The same concept may be applied to strings or arrays of LED light emitters by appropriately scaling the current capabilities of the circuit. The combination voltage divider and user-operated switches may be configured differently, such as using solid state switching elements instead of discrete mechanical switches Various types of transistors and micro controllers may be substituted, depending on the application.

What is claimed is:

1. A brightness control circuit for an LED emitter, comprising:
    an LED and a transistor connected in series across a DC voltage source having a source terminal and a return terminal;
    a microprocessor having a non-volatile memory, the microprocessor connected across the DC voltage source, and an output of the microprocessor connected to an input of the transistor;
    a switch actuator circuit comprising at least one single pole, momentary, non-latching switch coupled between at least one input of the microprocessor and the return terminal for entering user commands to select discrete first, second and third brightness levels of the LED emitter; and
    a program stored in the non-volatile memory containing control instructions defining a sequence of pulse width modulated signals in a repeating first defined interval and responsive to the operating state of the switch actuator circuit for controlling the discrete first, second and third brightness levels of the LED emitter corresponding respectively to high, medium, and low brightness; wherein
    the program cycles through each brightness level in a predetermined sequence when a switch contact of the switch actuator is held closed; or
    the program stops within a brightness level in the sequence when the switch contact of the switch actuator is released to select that brightness level.

2. The circuit of claim 1, wherein:
    the high, medium, and low brightness levels of the LED correspond to duty cycle ON times of approximately 80%, 50%, and 20% respectively.

3. The brightness control circuit of claim 1, wherein the switch actuator comprises:
    at least first and second single pole switches coupled between corresponding first and second inputs of the microprocessor and the return terminal.

4. The brightness control circuit of claim 3, wherein:
    the at least first and second single pole switches control the brightness of separate first and second LED emitters.

5. The brightness control circuit of claim 4, wherein the separate first and second LED emitters comprise:

an LED and lens assembly; wherein
the first LED emitter provides a spotlight beam; and
the second LED emitter provides a floodlight beam.

6. The brightness control circuit of claim 3, wherein:
operation of both first and second single pole switches at the same time activates the first and second LED emitters together.

7. The brightness control circuit of claim 1, wherein:
operation of the at least one single pole switch twice in a sequence of press-release-press-release activates the LED emitter in a strobed sequence; and
operation of the single pole switch in a third press-release sequence extinguishes the strobed sequence.

8. A brightness control circuit for an LED device, comprising:
an LED and a transistor connected in series across a DC voltage source having a source terminal and a return terminal;
a PWM generator connected across the DC voltage source, and an output of the PWM generator connected to an input of the transistor;
an input of the PWM generator connected to the DC voltage source through a first resistor and the input of the PWM generator connected to the return terminal of the DC voltage source through a parallel combination of a second resistor in series with a first SPST (single pole, single throw) switch and a second SPST (single pole, single throw) switch; wherein
the first and second SPST switches are operable in a make-before-break sequence.

9. The circuit of claim 8, wherein:
the PWM generator is a microcontroller programmed to provide a sequence of duty cycle signals responsive to the operating states of the first and second SPST switches such that each duty cycle signal controls a defined brightness level of the LED device.

10. The circuit of claim 9, wherein:
the sequence of states of the first and second switches are associated respectively with duty cycles defined as discrete high, medium, and low brightness levels of the LED.

11. The circuit of claim 10, wherein:
the high, medium, and low brightness levels of the LED correspond to duty cycle ON times of approximately 80%, 50%, and 20% respectively.

12. The circuit of claim 8, wherein:
the first and second SPST switches are coupled to a single actuator, thereby enabling sequential, make-before-break actuation.

13. The circuit of claim 8, wherein:
the first and second SPST switches are operable in a sequence of states defined as (a) both OFF, (b) first switch ON and second switch OFF, (c) second switch ON after the first switch OFF, and (a) both OFF.

14. The circuit of claim 13, wherein:
the (c) state operation is a make-before-break sequence of the second and first SPST switches.

15. The circuit of claim 8, wherein:
the first and second SPST switches are implemented on a printed circuit board with a snap-action actuator that provides the make-before-break operation.

16. The circuit of claim 8, wherein:
the transistor is a field effect transistor with its drain-source circuit connected in series with the LED.

17. The circuit of claim 8, wherein:
the transistor is a bipolar transistor with its collector-emitter circuit connected in series with the LED.

18. The circuit of claim 8, wherein:
the first and second SPST switches are configured as normally open switches.

19. The circuit of claim 8, further comprising:
a third resistor coupled between the DC voltage source and the LED.

20. The circuit of claim 8, further comprising:
a fuse coupled between the DC voltage source and the LED.

21. The circuit of claim 8, further comprising:
a third resistor coupled between the transistor and the return terminal of the DC voltage source.

22. The circuit of claim 21, wherein:
the third resistor is coupled between a second input of the PWM generator and the return terminal of the DC voltage source.

23. A brightness control circuit for an LED emitter, comprising:
an LED and a transistor connected in series across a DC voltage source having a source terminal and a return terminal;
a microprocessor having a non-volatile memory, the microprocessor connected across the DC voltage source, and an output of the microprocessor connected to an input of the transistor;
a switch actuator circuit comprising a set of momentary SPST (singe pole, single throw) switch contacts connected between an input of the microprocessor and a return terminal, coupled between the source and return terminals and having an output coupled to an input of the microprocessor for entering user commands to select discrete brightness modes of operation of the LED emitter; wherein
the SPST switch contacts, when held closed by a user, engage a defined sequence in the program for signaling a desired brightness mode of operation of the LED emitter; and
a program stored in the non-volatile memory containing control instructions defining a sequence of pulse width modulated signals in successive first, second, and third modes, each for a defined interval corresponding to respective high, medium, and low brightness levels responsive to the operating state of the switch actuator circuit for controlling the brightness levels of operation of the LED emitter; wherein
the program cycles through each brightness mode in the defined sequence when the SPST switch contacts are held closed; or
the program stops within a brightness mode in the defined sequence when the SPST switch contacts are released.

24. The circuit of claim 23, wherein:
the high, medium, and low brightness levels of the LED correspond to duty cycle ON times of approximately 80%, 50%, and 20% respectively.

25. The brightness control of claim 23, wherein the switch actuator circuit comprises:
a first resistor connecting the input of the microprocessor to the source terminal;
a second resistor and a first set of SPST switch contacts connected in series between the input of the microprocessor and the return terminal; and
a second set of SPST switch contacts connected between the input of the microprocessor and the return terminal; wherein
the first and second sets of SPST switch contacts are coupled together such that after the first set of SPST switch contacts are closed in a first step, executing a second step closes the second set of contacts before opening the first set of contacts in a make-before-break sequence.

* * * * *